(12) United States Patent
Chandra

(10) Patent No.: US 8,434,069 B2
(45) Date of Patent: Apr. 30, 2013

(54) SYSTEM AND METHOD FOR EFFORT ESTIMATION

(75) Inventor: Saurabh Chandra, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 1002 days.

(21) Appl. No.: 12/355,192

(22) Filed: Jan. 16, 2009

(65) Prior Publication Data

US 2010/0153782 A1 Jun. 17, 2010

Related U.S. Application Data

(60) Provisional application No. 61/122,762, filed on Dec. 16, 2008.

(51) Int. Cl.
*G06F 11/28* (2006.01)
(52) U.S. Cl.
USPC .............................. 717/135; 714/35
(58) Field of Classification Search .............. 714/35; 717/135
See application file for complete search history.

(56) References Cited

U.S. PATENT DOCUMENTS

| | | | |
|---|---|---|---|
| 6,546,506 B1 * | 4/2003 | Lewis | 714/38.1 |
| 6,658,643 B1 * | 12/2003 | Bera | 717/101 |
| 6,697,961 B1 * | 2/2004 | Petrenko et al. | 714/26 |
| 6,889,337 B1 * | 5/2005 | Yee | 714/1 |
| 7,080,351 B1 * | 7/2006 | Kirkpatrick et al. | 717/102 |
| 7,260,184 B1 * | 8/2007 | Howard et al. | 379/9 |
| 7,305,654 B2 * | 12/2007 | Patel et al. | 717/101 |
| 7,757,175 B2 * | 7/2010 | Miller | 715/738 |
| 7,979,845 B2 * | 7/2011 | Marimuthu | 717/124 |
| 2005/0050551 A1 * | 3/2005 | Sparago et al. | 719/320 |
| 2005/0172269 A1 * | 8/2005 | Johnson et al. | 717/124 |
| 2006/0206867 A1 * | 9/2006 | Parsons et al. | 717/124 |
| 2007/0162316 A1 * | 7/2007 | Kratschmer et al. | 705/8 |
| 2007/0174702 A1 * | 7/2007 | Meyer | 714/33 |
| 2008/0092120 A1 * | 4/2008 | Udupa et al. | 717/124 |
| 2008/0282235 A1 * | 11/2008 | Jadhav et al. | 717/131 |
| 2008/0313008 A1 * | 12/2008 | Lee et al. | 705/10 |
| 2009/0319317 A1 * | 12/2009 | Colussi et al. | 705/7 |

\* cited by examiner

*Primary Examiner* — Don Wong
*Assistant Examiner* — Theodore Hebert
(74) *Attorney, Agent, or Firm* — Kilpatrick Townsend & Stockton LLP

(57) ABSTRACT

Methods and systems are provided to estimate the time to implement a regression test. A productivity table may be defined and stored in a host computer system, where the productivity table indicates the time expected to perform a plurality of automation script types at a plurality of complexity levels. The host computer system may receive a list of test flows to be used in conducting a regression test and a selection of a complexity level for each of the listed test flows. Complexity levels may be defined by, and a complexity level for a test flow may be selected based upon a variety of system- and test-related criteria. The total implementation time may be determined based on the complexity levels assigned to test flows in the regression test, the type of scripts used, and the productivity table.

14 Claims, 7 Drawing Sheets

FIG. 2A

| Step No. | Group No. | Title | Complex. Level | Script Type | Source Script | Tests | Checkpoints | Est. Time |
|---|---|---|---|---|---|---|---|---|
| | | | | | | | | |
| | | | | | | | | |
| | | | | | | | | |

FIG. 2B

| Step No. | Group No. | Title | Complex. Level | Script Type | Source Script | Tests | Checkpoints | Est. Time |
|---|---|---|---|---|---|---|---|---|
| 1 | — | Generate login | 2 | Param. Call | login.sh | | | |
| 2.1 | 5 | Select "Invoice" | 6 | New Function | — | | | |
| 2.2 | — | Select "Quick Invoice" | 9 | New Script | — | | | |
| 3 | — | Print displayed invoice | 4 | Data Custom. | print_shell.sh | | | |

FIG. 2C

| Step No. | Group No. | Title | Complex. Level | Script Type | Source Script | Tests | Checkpoints | Est. Time |
|---|---|---|---|---|---|---|---|---|
| 1 | — | Generate login | 2 | Param. Call | login.sh | | | 0.2 |
| 2.1 | 5 | Select "Invoice" | 6 | New Function | — | | | 2.5 |
| 2.2 | — | Select "Quick Invoice" | 9 | New Script | — | | | 6 |
| 3 | — | Print displayed invoice | 4 | Data Custom. | print_shell.sh | | | 2 |

SYSTEM AND METHOD FOR EFFORT ESTIMATION

CROSS-REFERENCE TO RELATED APPLICATIONS

This application claims priority to U.S. Provisional Application No. 61/122,762, filed Dec. 16, 2008, the disclosure of which is incorporated by reference in its entirety for all purposes.

BACKGROUND OF THE INVENTION

As modern software becomes more complex, increasingly sophisticated techniques are used to test the functionality of the software. A common technique used in test automation is to map manual steps to an automated testing tool. A manual test, such as a series of actions performed using the software to be tested, is used to generate a regression test made of one or more scripts. The manual steps may be mapped to a script by "recording" the steps performed by a human operator, and "playing" those steps to test the software. The recorded steps may be, and often are, modified by an automation engineer to test similar steps, improve efficiency or accuracy, allow for re-use of the script, etc. The regression test is then run on the software and adjusted to further test additional features of the software, isolate errors encountered during the initial test, or make other adjustments to the regression test.

In general, a software program or package for which regression testing is to be performed may include multiple features, and a feature may include one or more sub-features. For example, a banking application may include the features of generating an invoice, updating a customer account, and processing a payment; the invoice feature may include a sub-feature such as generating a "quick invoice." The combination of user input, processing, and navigation associated with a specific feature or sub-feature may be referred to as a functional flow.

When testing a piece of software, a "test flow" may refer to the section of actions, input, and navigations required to traverse a functional flow. As a specific example, a banking program may provide for printing a "quick invoice" by performance of the following actions by a user: selecting the application, entering a username and password, selecting "invoices" from a list of functions, selecting a "quick invoice" hyperlink, and selecting "print" from a function menu. This series of functions may be duplicated in a test flow by generating the appropriate selections, actions, and other input required to traverse the functional flow. For example, the actions may be encoded in a script which performs automated actions sufficient to activate each step in the functional flow when executed. To test one or more features in the software, the appropriate test flows may be performed within the software. A collection of scripts used to test one or more features may be referred to as a regression test or test suite.

Although typical regression test techniques are automated, each test suite is still unique to, or at least partially customized to a particular piece of software. In general, a test or test suite designed for one software application cannot be directly used to test a different application. This creates difficulty in estimating the amount of time that any particular test suite will require to create and deploy, since each application to be tested must be considered individually.

BRIEF SUMMARY OF THE INVENTION

According to an embodiment of the present invention, a computer-implemented method to estimate the time to implement a regression test may include storing a productivity table in a host computer system, where the productivity table indicating the time expected to perform a plurality of automation script types at a plurality of complexity levels. The host computer system may receive a list of test flows to be used in conducting a regression test and a selection of a complexity level for each of the listed test flows. Complexity levels may be defined by, and a complexity level for a test flow may be selected based upon: the available resources of a computer system on which the regression test will be performed; the environment in which the regression test will be performed; statistical data describing scripts used in the test flow; the types of scripts used in the test flow; test definition documentation; and/or the technical knowledge of personnel associated with implementing the test flow.

According to an embodiment of the present invention, statistical data describing scripts used in the test flow may include the number of scripts in the flow; the number of input fields in a page to be tested by the regression test; the number of checkpoints set per script; the amount of parameterization per script; the number of reporting statements per script; the number of conditional loops per script; the number of iterations per script; the number of conditional loops per iteration per script; and/or the type of technology being recorded during the test flow.

According to an embodiment of the present invention, based upon the complexity level selected for each flow, the type of script used in the test flow, and the productivity table, the host computer system may determine the expected time to implement each of the test flows and, based upon the expected completion times, the total expected time to implement the regression test. The total expected time to implement the regression test may be stored in the host computer system.

According to an embodiment of the present invention, a stabilization factor may be used to adjust the total expected time to implement a regression test.

According to an embodiment of the present invention, a group correction factor may be applied based upon a second complexity level for at least one of the test flows.

According to an embodiment of the present invention, test definition documentation may include a test case document; a functional document; a user guide document; and/or a requirements document.

According to an embodiment of the present invention, the computer system on which the regression test is to be performed is separate from the host computer system.

BRIEF DESCRIPTION OF THE DRAWINGS

FIGS. 2A-2C show an example of a user interface for assigning complexity levels and script types to a set of test flows in a regression test according to an embodiment of the invention.

DETAILED DESCRIPTION OF THE INVENTION

It has been found that the time to implement a regression test suite can be accurately estimated by defining a set of complexity levels and associated productivity norms, then applying the complexity levels and norms to the test flows that make up each test suite to estimate the implementation time that can be expected for each test flow. The total implementation time for the test suite can then be estimated based on the time for each test flow and, in some cases, an appropriate correction factor.

Figure 1:
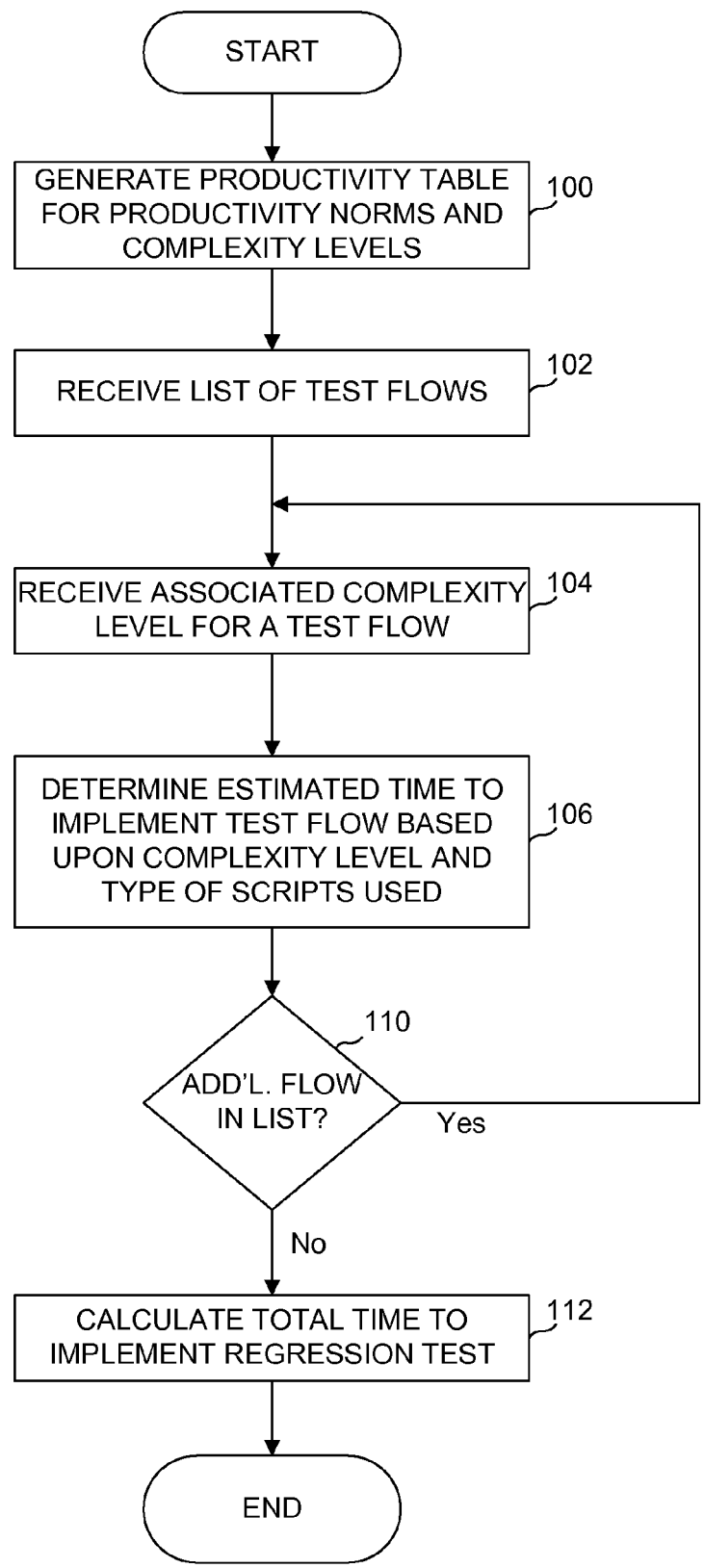
FIG. 1 shows an example process for estimating the amount of time required to implement a regression test for one or more features of a software program according to an embodiment of the invention.

FIG. 1 shows an example process for estimating the amount of time required to implement a regression test for one or more features of a software program according to an embodiment of the invention. At step 100, a productivity table mapping productivity norms to complexity levels for a set of script categories may be generated by and/or stored in a host computer system. The host computer system may be the same computer system on which the software to be tested is executed or, more often, it may be a separate computer system. The productivity lists a set of script categories that describe the types of scripts that may be used to implement a test flow. For each category, the table stores productivity norms for a set of complexity levels. A productivity norm indicates the expected average time to implement scripts of various complexities (as defined by the complexity levels), in each of the script categories. A productivity table may be generated, for example, based on historical implementation times, an automated polling of developer time, based upon input from one or more developers, or using any other suitable method.

Table I shows an example productivity table according to an embodiment of the invention. The table assigns productivity norms for each of five script categories at each of 12 complexity levels, with a higher complexity level indicating a higher expected effort required to implement a script in the category. For example, an expected average time to create a "Customized Script" with a complexity level of 9 is 2.5 hours, whereas a script of the same type with a complexity level of 2 has a productivity norm of 0.2 hours. The productivity norms shown in the table are provided as an example, and it will be understood that other categories, numbers of complexity levels, and associated productivity norm times may be used.

It has been found that the norms shown in Table I provide a relatively accurate estimate of the average time spent to implement a test flow and/or a regression test suite. As described in further detail below, the expected implementation time at each complexity level may be based upon or determined from a combination of factors, including the available computing resources, the software environment being tested, the availability of test documentation, the experience and skill of associated personnel, and other factors. According to an embodiment of the invention, the complexity levels may be defined by the effort required according to each of the "(M^5)*E" factors, as described in further detail below.

In an embodiment of the invention, weighted values may be assigned to each script type across complexity levels by identifying the "duration bandwidth" i.e. the minimum and maximum expected duration for each script, then dividing the found bandwidth into 12 closed-spaced hourly intervals. The spaced intervals between complexity level 1 and 5, may be given lesser-weighted values across script types, since this range has been found to be the most frequently occurring in regression test development scenarios. It is believed that using a closed spacing for the most frequently-occurring scenarios may reduce the chances of variation between the calculated implementation time estimate and the actual estimation time. The intervals between complexity levels 6 and 9 are somewhat more spaced, since few scripts fall into these complexity levels. Further, within complexity level 10 to 12, the intervals are further increased since there are few regression test development tasks in these categories.

TABLE I

| Script Category | Productivity Norms (Hrs.) Complexity Levels | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| New Function | 0.5 | 1 | 1.5 | 2 | 2.5 | 3 | 4 | 5 | 6 | 8 | 10 | 12 |
| New Script | 0.5 | 1 | 1.5 | 2 | 2.5 | 3 | 4 | 5 | 6 | 8 | 10 | 12 |
| Data | 0.1 | 0.2 | 0.3 | 0.5 | 0.6 | 0.7 | 0.8 | 1 | 1.2 | 1.5 | 1.7 | 2 |
| Customized Script | 0.2 | 0.5 | 0.7 | 1 | 1.2 | 1.5 | 1.7 | 2 | 2.5 | 3 | 3.5 | 4 |
| Parameterized Call | 0.1 | 0.2 | 0.3 | 0.4 | 0.5 | 0.6 | 0.7 | 0.8 | 0.9 | 1 | 1.1 | 1.2 |

At 102, the host computer system may receive a list of test flows to be implemented for a regression test or test suite, for which the implementation time estimate is to be calculated. For example, a developer may provide a list of test flows that will be implemented as part of a regression test or test suite. The list of test flows may include additional information, such as a group identification that indicates a group correction factor that should be applied to each test flow, the number of tests in the flow, the number of checkpoints, and other information. This information may be used to calculate an implementation time estimate. An example interface for receiving a list of test flows is shown in FIGS. 2A-2C and described in further detail below.

At 104, the host computer system may receive a complexity level assignment for some or all of the test flows in the list received at step 102. For example, a developer may examine the list of test flows and, for each test flow the developer is associated with implementing, may assign a complexity level. The assigned complexity level may be based on the developer's assessment of the effort required to implement the test flow, for example by considering the factors used to define the complexity levels, as applied to the specific test flow to which a complexity level is being assigned. An example interface for receiving a list of test flows is shown in FIGS. 2A-2C and described in further detail below.

Based upon the complexity level assigned to each flow, the type of script or scripts used for each flow, and the appropriate entries from the productivity table, the host computer system may then determine the expected time required to implement the test flow at 106. As a specific example using the productivity table shown as Table I, a developer may specify a test flow that requires a new script (i.e., type "New Script") and assign a complexity level of 7. Using this information and the example productivity table, the host computer system would determine that the flow would be expected to take four hours to implement. As described in further detail below, additional correction factors may be applied to alter this value and generate a potentially more accurate estimate.

As shown at 110, steps 104 and 106 may be repeated for multiple test flows specified for a test or test suite. The specific order shown in FIG. 1 is provided as an example; the specific order in which the test flows and associated complexity levels are received, and the expected implementation times are calculated may be performed in a different order, and/or in parallel. For example, a developer may provide each test flow and its associated complexity level in turn, instead of providing the list of test flows and then assigning complexity levels. The steps may be performed by different entities, such as where the list of test flows is automatically generated or provided by a first developer, and the complexity levels are later provided by another developer. The estimated implementation time calculated at 106 may be calculated for each test flow as the script type and complexity level is provided, or the implementation times for a set of test flows may be calculated after all the complexity levels and script types are received. Other variations are possible.

At 112, the host computer system may calculate the total time to implement the regression test or test suite defined by the listed test flows. Typically, the total implementation time may be calculated by adding the implementation times calculated for the listed flows. As described in further detail below, additional adjustment factors may be applied to the implementation times for some or all of the flows prior to calculating the total implementation time for the regression test.

FIGS. 2A-2C show an example of a user interface for assigning complexity levels and script types to a set of test flows in a regression test according to an embodiment of the invention. FIG. 2A shows an interface with no test flows or other data entered. FIG. 2B shows the same interface as FIG. 2A, after a set of test flows for a regression test have been entered. Additional data may be entered, such as the number of tests, checkpoints, or other event or item associated with each test flow. A test flow may be assigned a group for purposes of applying a group correction factor as described in further detail below. The test flows may have been previously defined, and may have been defined automatically or by a developer. The script types and/or complexity levels also may be assigned to the test flows at the same time and/or by the same developer that provides the list of test flows.

Figure 3:
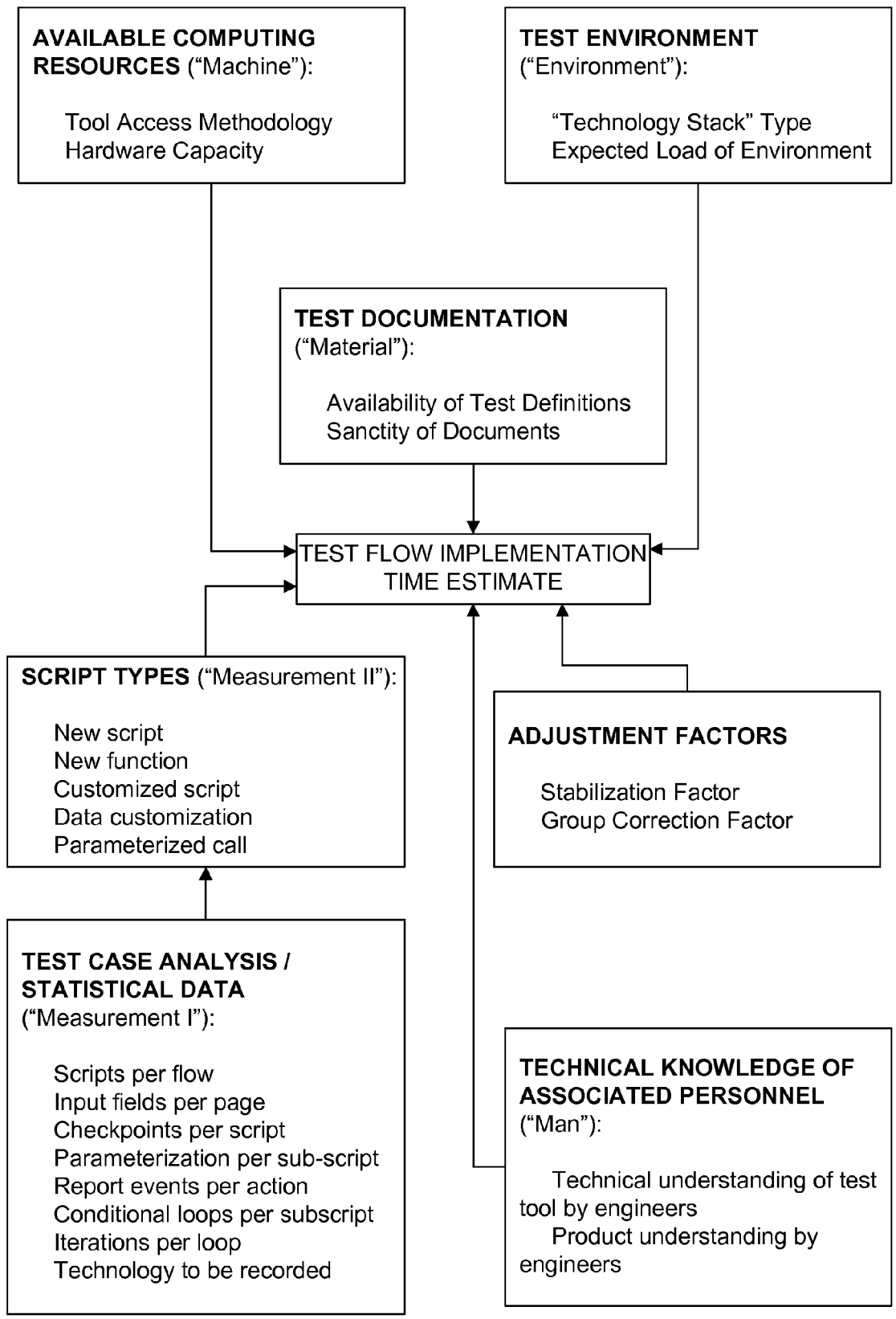
FIG. 3 shows a schematic illustration factors used to define complexity levels and calculate an estimated implementation time according to an embodiment of the invention.

FIG. 2C shows the user interface of FIGS. 2A-2B after the host computer system has calculated the estimated implementation time for each of the test flows, based upon the script type and complexity level for each test flow, and a stored productivity table as previously described. The estimated times shown in FIG. 2C are those that result from the example productivity table shown in Table I. These values are illustrative, and other script types, test flows, and complexity levels may be used. After calculating the expected implementation time for each test flow, the total expected implementation time for a regression test including Complexity levels may be defined based on a variety of factors. According to an embodiment of the invention, these factors may be logically arranged into several types or groups: available computing resources, test documentation, technical knowledge, test case statistical data, script type assignment or mapping, and test environment factors. These factors may be referred to in short-hand as machine, material, man, measurement 1, measurement 2, and environment factors, respectively (collectively, the "(M^5)*E factors"). The resulting model is referred to as the (M^5)*E model. Each type of factor is described in further detail below. FIG. 3 shows a schematic illustration of the (M^5)*E factors according to an embodiment of the invention. Each factor may be considered when assigning a complexity level to a specific test flow.

According to an embodiment of the invention, the available computing resources of a computer on which a tool is to be deployed, as well as associated resource needs ("machine" factors) may affect the complexity level of a test flow. This category may include factors such as the hardware capacity on which the test tool is deployed and the tool access methodology.

Hardware capacity on which the test tool been deployed: Generally, test tool vendors provide a machine specification and free disk space requirement believed to allow a test tool to operate at an acceptable efficiency when in use. However, if the appropriate resources are not actually allocated to the test tool, then the recording speed of the tool may be affected. As a result, increased development time may be required to implement the regression test. If it is believed that insufficient resources have been allocated, an automation engineer may assigned a higher complexity level to affected test flows.

Tool Access Methodology. In some configurations, a test tool may be installed at a location remote from those using the tool. For example, a global organization may deploy a server at any one location. A test tool may be deployed on the server, which has a limited number of concurrent licenses. The test tool is then accessed by multiple users using remote connectivity. However, if the network speed and/or bandwidth available to remote users who access the server is lower than an optimal level, both the recording speed of the test tool and the response time of the software application being tested may be reduced. An automation engineer may assign a higher complexity level if the access methodology may undesirably impact use of the test tool. It has been found that differences in the tool access methodology can cause differences of up to 300% in the time required to implement a regression test.

According to an embodiment of the invention, the availability and sanctity of test documentation ("material") may affect the complexity level assigned to a test flow. If documentation of all functionality to be tested is readily available and not likely to change during testing, a lower complexity level may be assigned. However, if less documentation is available or the available documentation is subject to frequent or dramatic changes, a higher complexity level may be assigned. Examples of documentation that should be considered when evaluating this factor include test case documents, functional documents, user guides or manuals, and test requirement documentation.

According to an embodiment of the invention, the technical knowledge of personnel associated with the regression test and/or the test flow ("man" factors) may affect the complexity level assigned to a test flow. In general, the more knowledge and experience associated personnel (such as automation engineers and managers) have with the appropriate technologies, the lower the complexity level that may be assigned to a test flow. Examples of specific factors that may contribute to the technical knowledge of associated personnel are provided below.

Product knowledge of automation engineers. The complexity of the software product being tested as well as the complexity of a specific test flow may be considered. The complexity level may be assigned based on a combination of an automation engineer's expertise and the expected complexity of the specific task being considered. For example, a minimally-complex task assigned to an experienced automation engineer may be assigned a low complexity level. Similarly, a high complexity level may be assigned if a complex task is to be performed by a less-experienced engineer, or where an experienced engineer has minimal knowledge of the specific task to be performed. In general, if the expertise of the associated personnel does not match with the task to be performed, a higher complexity level may be assigned. In some cases, there may not be appropriate personnel with knowledge or experience of the specific product being tested. For example, a highly experienced automation engineer may not be familiar with the software product for which the regression test is to be created. This type of situation may be addressed by assigning a higher complexity level as previously described. In addition, according to an embodiment of the invention, additional stabilization time may be assigned to the test flow. The use of additional stabilization time and other adjustment factors is described in further detail below.

Technical understanding of the testing tool. In addition to having different levels of expertise with respect to the software product being tested, personnel associated with a test flow or regression test may have different levels of experience with or understanding of the tool used to create the regression test. In general, it may be preferred for automation engineers to be provided with training on the test tool. This may allow automation engineers to more accurately select complexity levels when evaluating test flows, and may also allow for improving automation efforts in general. However, if appropriate training has not been provided, or associated personnel otherwise have relatively low levels of expertise with the test tool, then a higher complexity level may be assigned. In general, a higher complexity level may be assigned for lower levels of expertise with the testing tool.

Technical knowledge repository. In some cases, an existing technical inventory may be re-used when implementing a test flow. The degree to which such a repository is available and understood by the associated personnel may affect the complexity level assigned to a test flow. In general, the a lower complexity level may be assigned where there are more resources available for re-use and they are better understood by the associated personnel.

According to an embodiment of the invention, the available test environment ("environment") may affect the complexity level of a test flow. Examples of factors that may be considered with respect to the test environment include the type of technology to be automated and the expected processing load of the system on which the software to be tested is run during the test.

Type of technology to be automated. It is possible that a software application being tested includes several technologies embedded within it. For example, a web-based application may include Javascript or other browser-executed components, back-end scripting components, database access, and other components. As more technologies are included in a software application, it becomes more difficult to efficiently test the application. For example, it may be increasingly difficult to identify objects of interest when recording scripts through an automation tool as more technologies are involved. This may increase the complexity involved in performing the task. Therefore, a higher complexity level may be assigned where multiple technologies are involved.

Processing load of the environment used to execute the tested software. A software application being tested may only be able to sustain a certain processing load. For example, a web-based application may only be configured to accept a certain number of hits per second, or its throughput may be otherwise limited. This can increase the time required to implement a test, since the response time of the application may be higher when fewer resources are available. In some cases, the processing resources available to the application may be changed during a test, such as where an of the system executing the tested software re-allocates resources away from the tested software while a test is being performed. In general, a higher complexity level may be assigned for configurations where fewer resources are available. In a situation where a poor response time because of application load is observed after an automation task has started, an additional stabilization time may be applied to the estimated implementation time. The use of additional stabilization time is described in further detail below.

According to an embodiment of the invention, various statistical data for the specific scripts involved in a test flow ("measurement 1" factors) may affect the complexity level of a test flow. This data may include, for example, the number of scripts per flow, number of input fields per page, number of checkpoints per script, degree of parameterization per script, number of event reporting statements per flow and/or per script, number of conditional loops per script, number of iterations per script, number of conditional loop per iteration per script, and the technology that is being recorded during test automation. Other factors may be considered. Generally, for more complex scripts, a higher the complexity level may be assigned. For example, a test flow that uses several scripts, each having several checkpoints and event reporting statements, with several conditional loops, may be assigned a higher complexity level than one that requires only a single script with minimal reporting statements and no conditional loops. Based on an analysis of several real-time cases, it has been observed that obtaining figures for these statistical elements with a variation of up to 10% between the estimated and actual data may have little or no impact in the accuracy of the resulting implementation time estimation.

According to an embodiment of the invention, after the factors described above ("measurement 1" factors) are identified, these factors may be used in conjunction with additional script data ("measurement 2 factors) to further define an appropriate complexity level of a test flow. This additional data may include, for example, the types of scripts used to implement a test flow. As previously described, different productivity norms may be defined for each script type at each complexity level. According to an embodiment of the invention, the types of scripts used to implement a test flow include new scripts, new functions, customized scripts, data customized scripts, and parameterized calls. A "new script" is a newly created script, not based on a previous script, which may include new recording or coding. A "new function" refers to a newly-created function, which may be called by other scripts or functions, and typically is created within a pre-existing script.

A "customized script" is one that has been adapted from a previously-existing script, typically with minimal or no changes. For example, if a first script, Script1, creates invoice INV1, and another invoice INV2 is to be created for a different customer, then the code of Script1 can be used to develop Script2 for INV2 by making only minimal changes. In this case, Script2 is categorized as customized script.

A "data customized" script is a script which does not involve recording or coding new functionality, but merely calls a pre-existing function For example, a "Create_Receipt( )" function may be available to create a receipt with few parameters as input to the function. A script which calls Create_Receipt by providing appropriate inputs is classified as a data customized script.

A "parameterized call" refers to a script called from a batch file, including appropriate parameters. Typically there is no new script creation involved with generating a parameterized call; there is only a call to a script previously developed with appropriate parameters read from a batch file.

Figure 4:
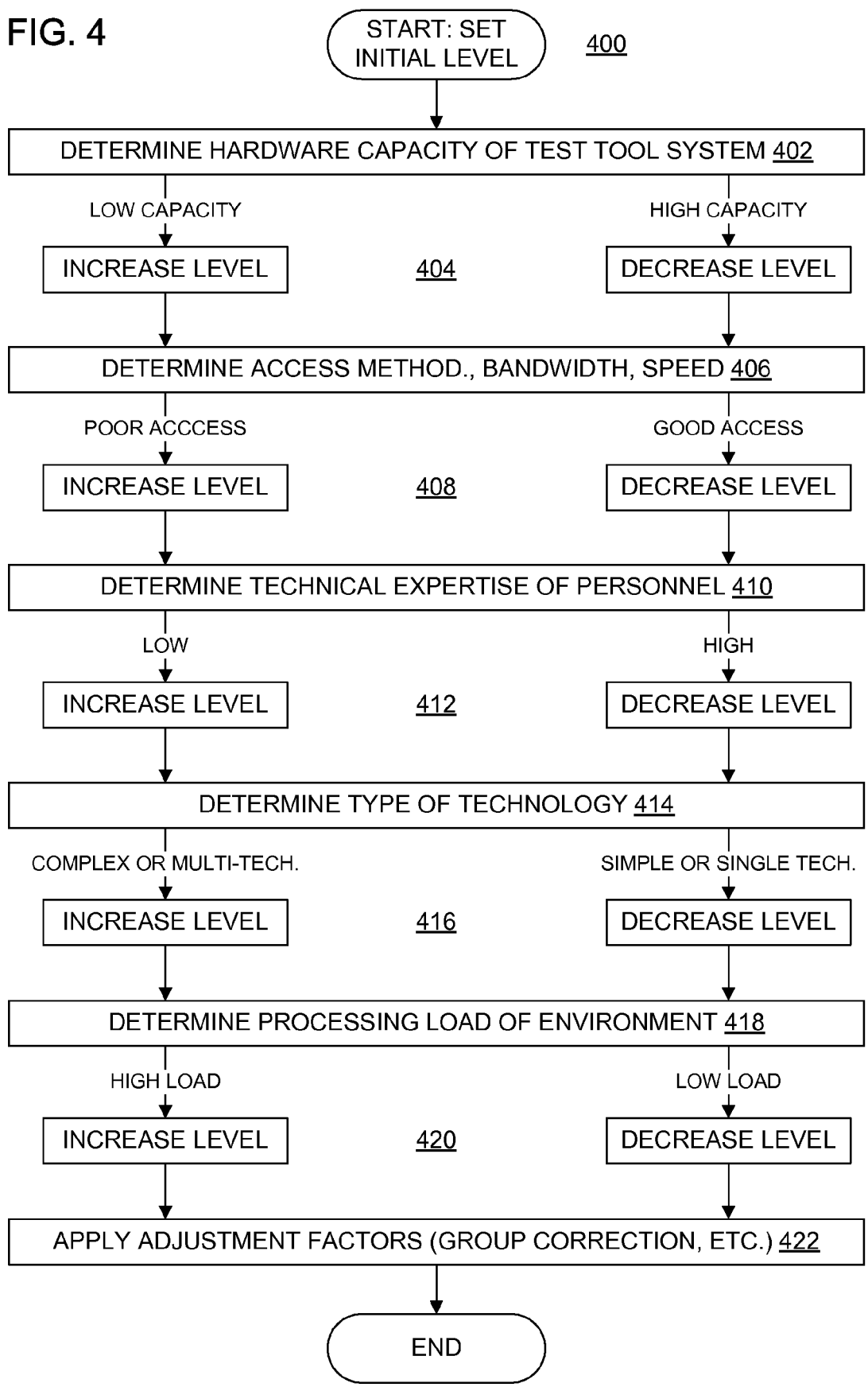
FIG. 4 shows an example process for determining a complexity level according to an embodiment of the present invention.

FIG. 4 shows an example process for determining a complexity level according to an embodiment of the present invention. At 400, an initial complexity level value may be set. For example, an intermediate level of 6 may be set. Alternatively, an initial level may be set based on the first factor examined. At 402, the hardware capacity of the test tool system may be determined, as previously described. At 404, if the test tool system has a low capacity, the complexity level may be increased; if it has a high capacity, the complexity level may be decreased. If no initial complexity level was set at 400, the level determined at 402 may be used as an initial complexity level. For example, if the system has a low capacity, a relatively high initial complexity level (e.g., 8-12) may be selected. Similarly, if the system has a high capacity, a relatively low initial complexity level (e.g., 1-4) may be selected. At 406, the access methodology, available bandwidth, and/or access speed may be determined. A poor or slow methodology may cause the complexity level to be increased at 408, and a fast or otherwise preferable methodology may cause the level to be decreased. At 410, the technical experience of associated personnel may be determined and, at 412, the complexity level increased or decreased based on a low or high expertise level, respectively. The type of technology to be tested may be determined at 414, and the complexity level increased (for complex or multi-part technology) or decreased (for a simple or single technology), respectively, at 416. The processing load of the test environment may be determined at 418, and the complexity level increased (for a high-load environment) or decreased (for a low-load environment) at 420.

Factors other than those specifically shown in FIG. 4 may be similarly examined, and the complexity level adjusted higher or lower as appropriate. Adjustment factors as described below also may be applied at 422, and may be applied to any intermediate step. When a process such as that shown in FIG. 4 is used to determine a complexity level, the level may be adjusted in pre-set increments for each factor, or it may be adjusted based on the degree to which the factor is expected to impact the effort required to implement the regression test. For example, a particularly high level of technical expertise may result in the complexity level being decreased by several steps (e.g., from 6 to 3), whereas an average or slightly low level of expertise may result in a smaller change, or no change at all. At each step, the complexity level may not be adjusted where the level is appropriate to the factor being considered, or where the factor does not appear to have an effect on the regression test under consideration. For example, if the complexity level is very low (1-3) after step 408 and the technical expertise is relatively high, the complexity level may not be further adjusted at step 412. Other combinations and factors may be used.

In some cases, various adjustment factors may be used to more precisely estimate implementation time for a regression test. According to an embodiment of the invention, a group correction factor may be applied when it is observed that an estimated implementation time is less than or more than required. To address this situation, a "group correction" factor may be applied. For example, an automation engineer may indicate that a script should be adjusted using a group correction factor and identify an initial complexity level for the script. The host computer may calculate the estimated implementation time using the average of initial complexity level and an additional complexity level for the test flow. In an embodiment, the host computer may automatically use a complexity level one lower than the initial complexity level identified by the automation engineer as the additional complexity level. In such an embodiment, the estimated implementation time for a test flow assigned complexity level 1 may be adjusted by deducting 10% of the calculated implementation time. The group correction factor may account for particular expertise of an automation engineer, new developments in automation tools, new programming techniques, or other elements to be taken into account when assigning a complexity value.

A group correction factor also may be used when different factors suggest that different complexity levels should be assigned to a test flow. For example, an automation engineer may determine that a flow requires a very simple script (suggesting a lower complexity level), but may also determine that the regression test will be performed on a system with limited resources available for the test (suggesting a higher complexity value). In such a situation, a group correction factor may be applied to select an appropriate average complexity level. In an embodiment of the invention, it is expected that these situations will be uncommon, since the complexity levels may be defined to encompass the most common combinations of factors within nearby complexity levels.

TABLE II

| Step No. | Title | Group No. | Complexity | Type | Person Hrs |
|---|---|---|---|---|---|
| 1.1 | Generate Login | 2 | 3 | New Script | 5.5 |

As a specific, non-limiting example, Table II shows a test flow to which a complexity level of 3 has been assigned. Using the example productivity table shown in Table I, this would normally result in an estimated implementation time of 6.0 hours, However, since the test flow has been marked for group correction (by the "2") the host computer may generate the mean of the appropriate expected times, i.e. (6.0+5.0)/2=5.5 hours. Thus, the model estimates 5.5 hours (instead of 6.0 hours for complexity level 3 or 5.0 hours for complexity level 2) to implement this test flow. In general, the expected implementation time may be calculated as the average of the expected implementation time for the script at complexity level n and the expected implementation time of the same script at complexity level n-1. For n=1, a standard reduction such as 10% may be applied. The host computer system may perform group correction automatically, such as by automatically averaging the time required for a selected complexity level with the time required for a complexity level one lower than the selected level. For example, if a very experienced or expert automation engineer is to perform an automation task, he may indicate that implementation time for the task should be adjusted using a group correction factor. The host computer may then determine the estimated implementation time using the selected complexity level and the complexity level one step lower as previously described.

According to an embodiment of the invention, a stabilization factor may be applied to customize the estimated implementation time within a specific test group, company, or other unit. For example, it may be observed that implementation time is regularly increased by any of a variety of generally unpredictable events. Thus, it may be desirable to adjust the implementation time estimate to allow additional time to account for these events. In an experiment using the $(M\textasciicircum5)*E$ method described herein over which 80 data samples were collected, it was found that a stabilization factor of 10% was sufficient to appropriately adjust the estimated implementation time. It will be understood that different values may be used. An appropriate stabilization factor may be determined based on empirical sampling or using other methods known in the art.

According to another embodiment of the invention, an additional "stabilization time" may be added to the total estimated implementation time to mitigate for unforeseeable occurrences during development of a regression test suite. Examples of such events include an unexpected leave of an associated automation engineer, unexpected technical review of one or more scripts, a serious or "showstopper" bug in the tested program or testing tool, or other similar events. The stabilization time may be added as a percentage of the estimated implementation time.

As previously described, according to an embodiment of the invention, a complexity level may be assigned to a test flow based upon an evaluation of the "(M^5)*E" factors previously described. Specific metrics for defining complexity levels or selecting a complexity level to assign to a particular test flow according to an embodiment of the invention are shown below. These definitions are illustrative only, and it will be understood that different complexity level definitions may be used without departing from the scope and spirit of the invention.

Complexity Level 1:
a) Simple record and playback, re-usable functions and scripts are available, not much coding is required during automation.
b) Product training is provided and functionalities to be automated are simple.
c) All required documents are available.
d) The "response time" of the environment being tested is sufficient for recording.
e) An associated automation engineer has a good understanding of the tool to be used for recording. No further tool exploration is required while recording.
f) A single "technology component" needs to be recorded.
g) The remote connection agent has good speed and bandwidth.

Complexity Level 2:
a) Simple record and playback, re-usable functions and scripts are available. Very little coding with few conditional loops is required.
b) Product training is provided, but functionalities to be automated are little complex
c) All required documents are available.
d) The "response time" of environment being tested is sufficient for recording.
e) The associated automation engineer has a good understanding of the tool to be used for recording. No further tool exploration is required while recording.
f) A single "technology component" needs to be recorded.
g) The remote connection agent has good speed and bandwidth.

Complexity Level 3:
a) Simple record and playback, re-usable functions and scripts are not available. Very little coding with few conditional loops is required.
b) Product training is provided but functionalities to be automated are slightly complex.
c) All required documents are available but are slightly complex and/or difficult to understand.
d) The "response time" of the environment being tested is sufficient for recording.
e) The associated automation engineer has a good understanding of the tool to be used for recording. No further tool exploration is required while recording.
f) A large percentage (e.g., 90-99%) of the product to be recorded involves a single "technology component".
g) The remote connection agent has good speed and bandwidth.

Complexity Level 4:
a) Simple record and playback, re-usable functions and scripts are not available. Very little coding with few conditional loops is required. Little parameterization of data is required.
b) Product training is provided and functionalities to be automated are of medium complexity.
c) All required documents are available but are slightly complex and/or difficult to understand.
d) The "response time" of the environment being tested is sufficient for recording.
e) The associated automation engineer has a good understanding of the tool to be used for recording. Little exploration of the tool is required while recording
f) Two different technology components are involved in recording, in the ratio 90:10 (simple: complex).
g) The remote connectivity agent has good speed and bandwidth.

Complexity Level 5:
a) Record and playback with more coding skills is required. Re-usable functions and scripts are not available. Coding with few conditional loops and little iteration is required. Little parameterization of data is required.
b) Product training is provided and functionalities to be automated are of medium complexity.
c) All required documents are available but are slightly complex and/or difficult understand. Some data is not in sync with application functionality. However, matching of scenarios, irrespective of this data discrepancy is not difficult.
d) The "response time" of the environment being tested is sufficient for recording.
e) The associated automation engineer has a good understanding of the tool to be used for recording. Little exploration of the tool is required while recording.
f) Two different technology components are involved in recording, in the ratio 80:20.
g) The remote connectivity agent has good speed and bandwidth.

Complexity Level 6:
a) Record and playback with more coding skills is required. New functions, new scripts, and parameterized calls need to be placed while recording. Several iterations of codes, while code drafting, are required.
b) Product training is provided and functionalities to be automated are of medium complexity.
c) All required documents are available. However, data is not in sync with application functionality. Hence, frequency of interaction with test case creator is required but not on frequent basis.
d) The "response time" of the environment being tested is sufficient for recording.
e) The associated automation engineer has a good understanding of the tool to be used for recording. Little exploration of the tool is required while recording.
f) Two different "technology components" are involved in recording, in the ratio 70:30.
g) The remote connectivity agent has good speed and bandwidth.

Complexity Level 7:
a) Record and playback with more coding skills is required. New functions, new scripts, and parameterized calls need to be placed while recording. Several iterations of codes, while code drafting, are required. A small amount of back end scripting is also required. Knowledge of a language other than a tool specific language is not required.
b) Product training is provided and functionalities to be automated are of high complexity.
c) All required documents are available. However, the data is not in sync with application functionality. Hence, frequency of interaction with "test case" creator is required on frequent basis.
d) The "response time" of the environment being tested is sufficient for recording.
e) The associated automation engineer has a good understanding of the tool to be used for recording. Little exploration of the tool is required while recording.
f) Two different technology components are involved in recording, in the ratio 90:10.
g) The remote connectivity agent has good speed and bandwidth.

Complexity Level 8:
a) Record and playback with more coding skills is required. New functions, new scripts, and parameterized calls need to be placed while recording. Several iterations of codes, while code drafting, are required. A small amount of back end scripting is also required. Knowledge of a language other than a tool specific language is not required.
b) Product training is provided and functionalities to be automated are of high complexity.
c) All required documents are not available. Data within provided document is not in sync with application functionality. Hence, frequency of interaction with "test case" creator is required on frequent basis.
d) The "response time" of the environment being tested fluctuates during recording.
e) The associated automation engineer has a good understanding of tool to be used for recording. Little exploration of the tool is required while recording.
f) Two different technology component are involved in recording, in the ratio 70:30.
g) The remote connectivity agent has good speed and bandwidth.

Complexity Level 9:
a) Record and playback with more coding skills is required. New functions, new scripts, and parameterized calls need to be placed while recording. Several iterations of codes, while code drafting, are required. A small amount of back end scripting is also required. Knowledge of a language other than a tool specific language is not required.
b) Product training is provided and functionalities to be automated are of high complexity.
c) All required documents are not available. Data within provided document or documents is not in sync with application functionality. Several test cases are missing. Hence, frequency of interaction with "test case" creator is very high.
d) The "response time" of the environment being tested fluctuates during recording.
e) The associated automation engineer has a good understanding of tool to be used for recording. Tool exploration is required.
f) A different technology stack is involved in recording. More than two technologies might also be involved.
g) The remote connectivity agent has good speed and bandwidth.

Complexity Level 10:
a) More coding skills are required. New functions, new scripts, and parameterized calls need to be placed while recording. Several iterations of codes, while code drafting, are required. More back end scripting is required. Knowledge of a language other than a tool specific language is required.
b) Product training is not imparted completely.
c) All required documents are not available.
d) The "response time" of the environment fluctuates during recording.
e) The automation engineer has a good understanding of the tool to be used for recording.
f) A different technology stack is involved in recording
g) The remote connectivity agent does not have good speed and/or bandwidth.

Complexity Level 11:
(a) More coding skills required. New functions, new scripts, and parameterized calls need to be placed while recording. Several iterations of codes, while code drafting, are required. Back end scripting is required. Knowledge of a language other than a tool specific language is required.
b) Product training is not imparted completely.
c) Test case data is available but data within the test case is not in sync with the latest version of the software being tested.
d) The "response time" of the environment is insufficient for recording.
e) The automation engineer needs to explore the test tool to a maximum amount.
f) A different technology stack is involved in recording.
g) The remote connectivity agent does not have good speed and/or bandwidth.

Complexity Level 12:
a) Complex programming codes need to be drafted while drafting scripts. Back end interaction is required to capture several data sets.
b) Product training is not imparted properly. Product has very complex features to be automated.
c) Test case is available but data within the test case is not in sync with the latest version of the software being tested.
d) The tested application's environment performance is very poor
e) The automation engineer needs to explore the test tool to a maximum amount.
f) A different technology stack is involved for recording. Recording of few of the objects can't be handled by normal record and playback mechanisms of the test tool.
g) The remote connectivity agent does not have good speed and/or bandwidth.

Figure 5:
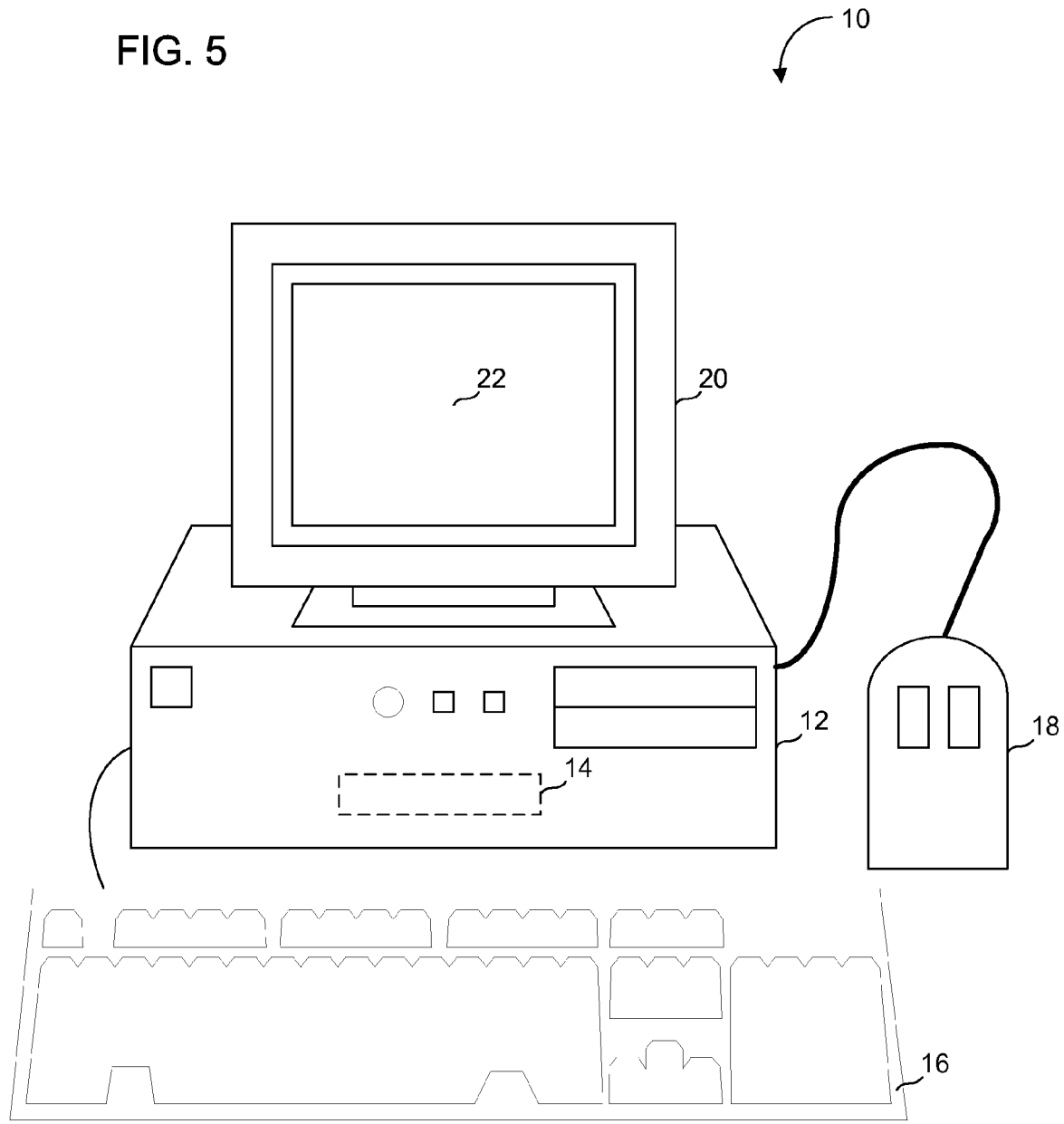
FIG. 5 shows a computer suitable for use with embodiments of the present invention.

FIG. 5 shows a computer suitable for use with embodiments of the present invention. The computer 10 may include a processing unit 12, which may include one or more computer readable storage media 14. The computer may interface with a human operator via an output 20, which may include a visual display 22 to display text, graphics, video, and other visual data. The computer may receive input via a mouse 18 and/or a keyboard 16. The general operation of the computer 10 will be understood to one of skill in the art.

Figure 6:
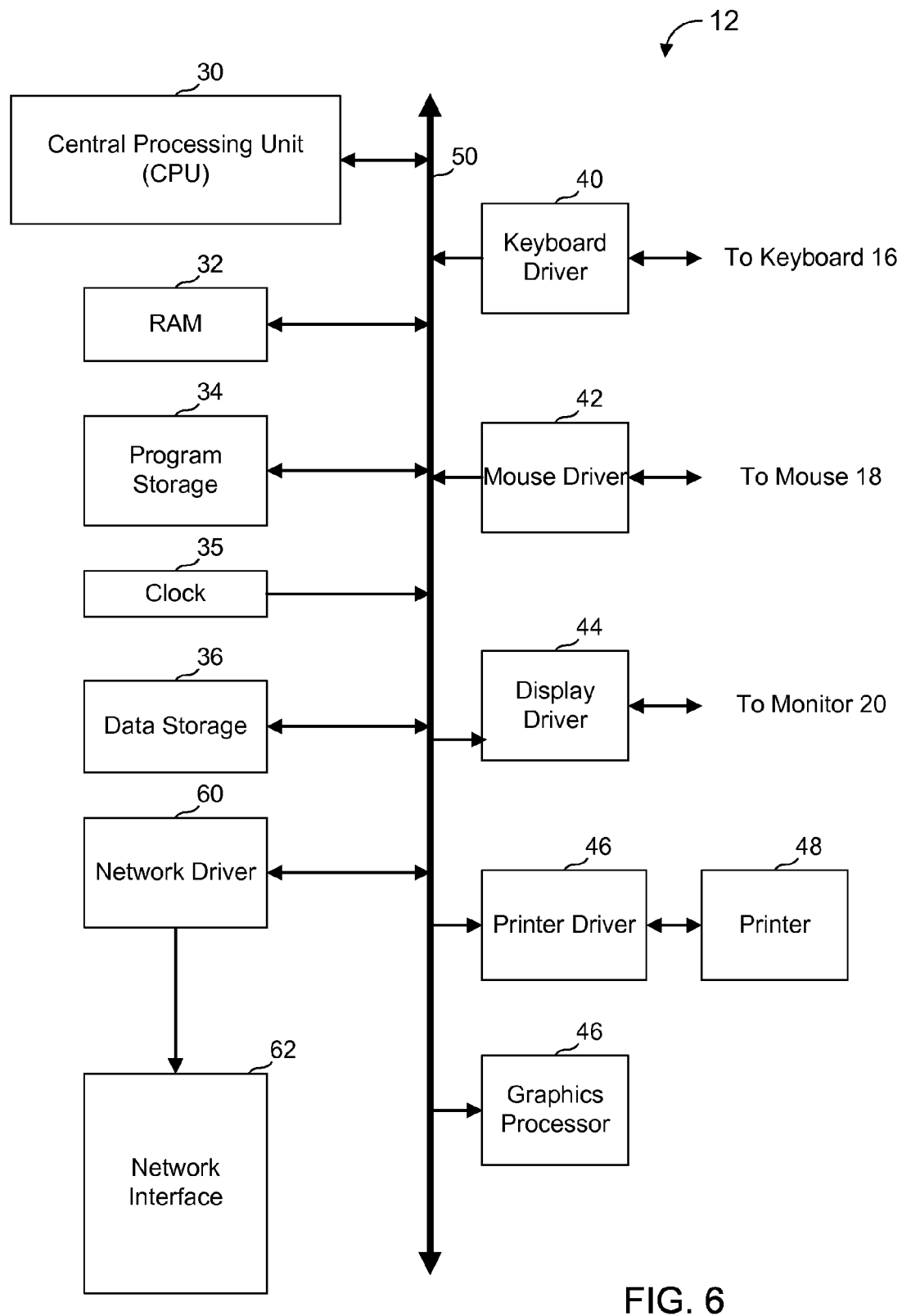
FIG. 6 shows a schematic diagram of the processing unit shown in FIG. 5.

FIG. 6 shows a schematic diagram of the processing unit 12. A central processing unit 30 may communicate with various other components via a main bus 50 and other suitable communication lines (not shown). Data may be stored in volatile memory such as RAM 32, program storage 34 and/or data storage 36. The program storage 34 and/or data storage 36 may include various types of computer-readable media, such as CD-ROMs or other type of optical disks, floppy diskettes, ROMs, RAMs, EPROMs, EEPROMs, magnetic or optical cards and drives, flash memory, or other types of machine-readable mediums suitable for storing electronic instructions. Computer-readable instructions may be stored in the program storage 34. When executed by the computer, these instructions may cause the computer to implement specific methods as described herein, and may cause the computer to operate in accordance with those methods. In an embodiment, execution of the instructions stored in the program storage 34 may transform a general-purpose computer into a computer configured to perform one or more methods embodied by the instructions. A clock 35 may be used to synchronize operation of the other elements of processing unit 12. A network driver 60 may manage connections between a network interface 62, such as a TCP/IP or other suitable interface, to allow the computer to communicate with other computers, operators, or other entities. A keyboard driver 40 may communicate with the keyboard 16 to receive input from an operator. A mouse driver 42 may manage communication with the mouse 18 to coordinate reception of input signals. A display driver 44 may manage communications between the processing unit 12 and the monitor 20, such as to display appropriate output on the monitor 20. Similarly, a printer driver 46 may manage communications with a printer 48. A graphics processor 46 may generate and manage manipulation and display of graphical elements such as 2D images, 3D images and objects, and other visual elements. The general operation of the various components shown in FIG. 6 otherwise will be understood by one of skill in the art.

Figure 7:
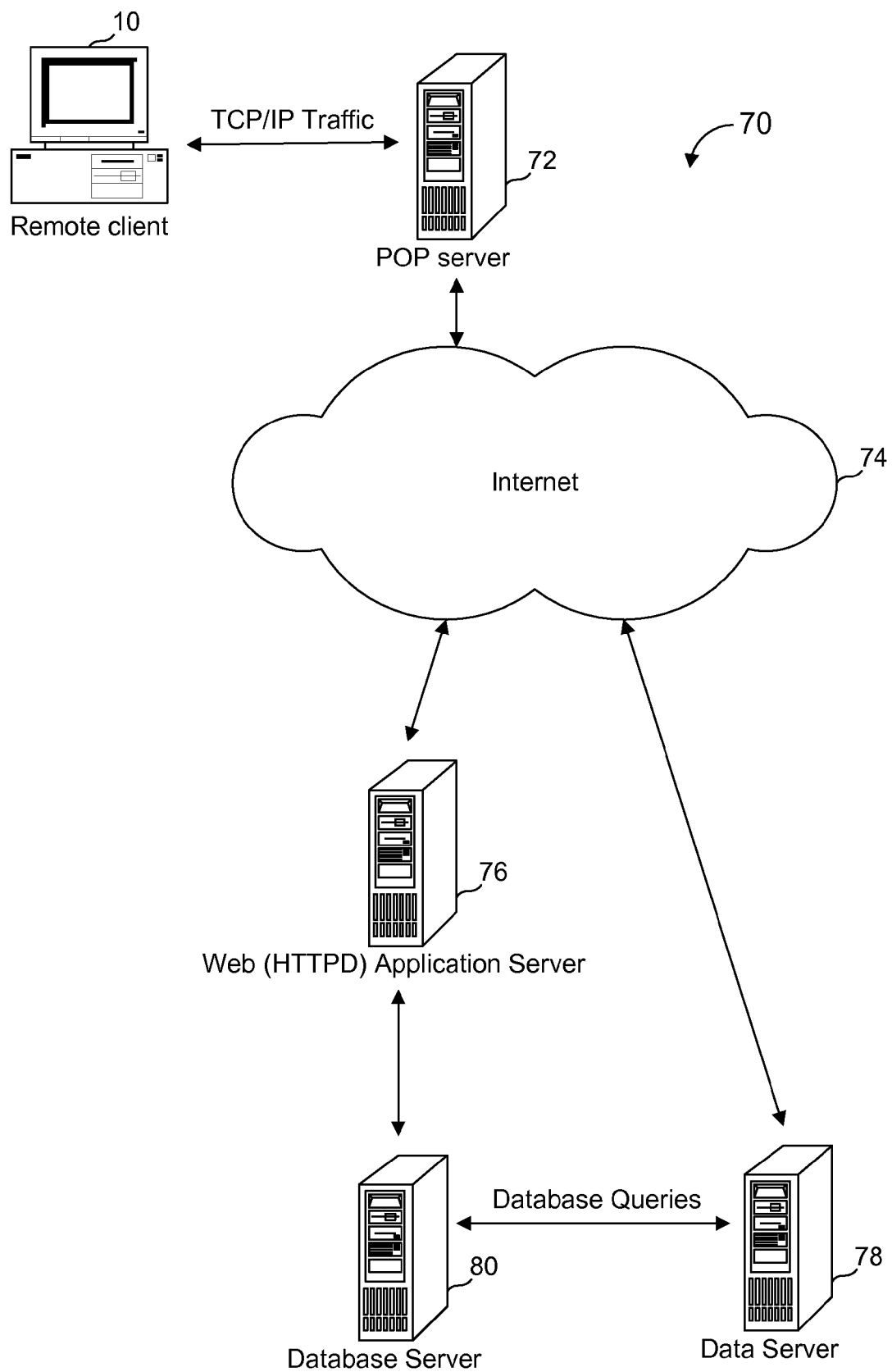
FIG. 7 shows a computer network system suitable for use with embodiments of the present invention.

FIG. 7 shows a system 70 suitable for use with embodiments of the present invention. A computer 10 may function as a remote unit, and connect to the Internet 74 or another network via a point-of-presence (POP) server 72 or directly. The computer 10 may connect to the internet, another network, and/or the POP server via the network interface 62 shown in FIG. 6. The computer 10 may communicate via the network 74 with a web server 76 or other application server, such as to allow for regression testing an application executed by the server 76, to access a testing tool executed by the server 76, or to perform other functions. The application server 76 may communicate with a database server 80, data server 78, or other servers and computers as will be understood by one of skill in the art.

EXAMPLE

An automation team in an IT services company used an earlier estimation model to estimate the effort required to implement a regression test suite. The earlier model required an accurate prediction of the number of lines of code, checkpoints, executed pages, iterations, remote and remote connectivity. Less accurate predictions in the earlier model directly caused inaccuracies in the estimated effort. It was found that the earlier model results in an variance of about 40% between the estimated and actual effort. In contrast, it was found that using the (M^5)*E model according to an embodiment of the invention reduced the variance to 0-5%.

In the foregoing description, for the purposes of illustration, methods were described in a particular order. It should be appreciated that the methods may be performed in a different order than that described. Additionally, unless indicated otherwise the methods may contain additional steps or omit steps described herein. The methods may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more computer-readable storage media. The methods also may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer-implemented method to estimate the time to implement a regression test, the method comprising:
   receiving, at a host computer system, a productivity table indicating a plurality of productivity norms for each type of automation script in a plurality of automation script types at a plurality of complexity levels, each productivity norm indicative of an expected time to implement a corresponding type of automation script at a corresponding complexity level;
   receiving, at the host computer system, a list of test flows associated with conducting a regression test, each test flow corresponding to at least one type of automation script in the plurality of automation script types;
   receiving, at the host computer system, a selection of a complexity level for each test flow in the list of test flows, the complexity level selected based upon:
      the available resources of a computer system on which the regression test will be performed;
      the environment in which the regression test will be performed;
      statistical data describing scripts used in the test flow;
      the types of scripts used in the test flow;
      test definition documentation; and
      the technical knowledge of personnel associated with implementing the test flow;
   determining, with a processor associated with the host computer system, an expected time to implement each test flow in the list of test flows at the complexity level selected for each test flow based upon the productivity table;
   determining, with a processor associated with the host computer system, a total expected time to implement the regression test based upon the expected implementation time of each test flow in the list of test flows; and
   storing, in the host computer system, the total expected time to implement the regression test.

2. The method of claim 1, further comprising:
   receiving, at the host computer system, a stabilization factor; and
   adjusting the total expected time to implement the regression test based upon the stabilization factor.

3. The method of claim 1, further comprising:
   responsive to an indication that a group correction factor should be applied, identifying a second complexity level for at least one of the test flows; and
   determining the expected time to implement the at least one test flow further based on the second complexity level.

4. The method of claim 3, wherein the second complexity level is one level lower than the selected complexity level.

5. The method of claim 1, further comprising displaying the total expected time by the host computer system.

6. The method of claim 1, wherein the statistical data describing scripts used in the test flow comprises at least one of:
   the number of scripts in the flow;
   the number of input fields in a page to be tested by the regression test;
   the number of checkpoints set per script;
   the amount of parameterization per script;
   the number of reporting statements per script;

the number of conditional loops per script;
the number of iterations per script;
the number of conditional loops per iteration per script; and
the type of technology being recorded during the test flow.

7. The method of claim 1, wherein the test definition documentation comprises at least one of:
a test case document;
a functional document;
a user guide document; and
a requirements document.

8. The method of claim 1, wherein the computer system on which the regression test is to be performed is separate from the host computer system.

9. A computer-implemented method comprising: receiving, at a host computer system, a productivity table indicating a plurality of productivity norms for each type of automation script in a plurality of automation script types at a plurality of complexity levels, each productivity norm indicative of an expected time to implement a corresponding type of automation script at a corresponding complexity level;
receiving, at the host computer system, a list of test flows associated with conducting a regression test, each test flow corresponding to at least one type of automation script in the plurality of automation script types;
receiving, at the host computer system, a complexity level for each test flow in the list of test flows, the complexity level defined by:
information describing resources used to perform the regression test; and
information describing the test flow;
determining the type of script used in the test flow;
determining, with a processor associated with the host computer system, a total expected time to implement the regression test based upon the expected implementation time of each test flow in the list of test flows; and
storing, in the host computer system, the total expected time to perform the regression test.

10. The method of claim 9, wherein the information describing resources used to perform the regression test includes a description of at least one of the following:
the available resources of a computer system on which the regression test will be performed; and
the computer environment in which the regression test will be performed;
technical knowledge of personnel associated with implementing the test flow.

11. The method of claim 9, wherein the information describing the test flow includes a description of at least one of the following:
statistical data describing tests used in the test flow;
the type of script used in the test flow; and
test definition documentation.

12. The method of claim 11, wherein the information describing the test flow includes a description of statistical data describing tests used in the test flow, and wherein the statistical data comprises at least one of the following:
the number of scripts in the flow;
the number of input fields in a page to be tested by the regression test;
the number of checkpoints set per script;
the amount of parameterization per script;
the number of reporting statements per script;
the number of conditional loops per script;
the number of iterations per script;
the number of conditional loops per iteration per script; and
the type of technology being recorded during the test flow.

13. The method of claim 9, wherein the computer system on which the regression test is to be performed is separate from the host computer system.

14. A non-transitory computer-readable storage medium storing a plurality of instructions which, when executed by a processor of a host computer system, cause the processor to estimate the time to implement a regression test, the non-transitory computer-readable medium comprising:
code for receiving a productivity table indicating a plurality of productivity norms for each type of automation script in a plurality of automation script types at a plurality of complexity levels, each productivity norm indicative of an expected time to implement a corresponding type of automation script at a corresponding complexity level;
code for receiving a list of test flows associated with conducting a regression test, each test flow corresponding to at least one type of automation script in the plurality of automation script types;
code for receiving a selection of a complexity level for each test flow in the list of test flows, the complexity level selected based upon:
the available resources of a computer system on which the regression test will be performed;
the environment in which the regression test will be performed;
statistical data describing scripts used in the test flow;
the types of scripts used in the test flow;
test definition documentation; and
the technical knowledge of personnel associated with implementing the test flow;
code for determining an expected time to implement each test flow in the list of test flows at the complexity level selected for each test flow based upon the productivity table;
code for determining a total expected time to implement the regression test based upon the expected implementation time of each test flow in the list of test flows; and
code for storing the total expected time to implement the regression test.

* * * * *

UNITED STATES PATENT AND TRADEMARK OFFICE
CERTIFICATE OF CORRECTION

| | | |
|---|---|---|
| PATENT NO. | : 8,434,069 B2 | Page 1 of 1 |
| APPLICATION NO. | : 12/355192 | |
| DATED | : April 30, 2013 | |
| INVENTOR(S) | : Chandra | |

It is certified that error appears in the above-identified patent and that said Letters Patent is hereby corrected as shown below:

In the Drawings

On Drawing sheet 4 of 7, in figure 4, line 7, delete "ACCCESS" and insert -- ACCESS --, therefor.

In the Specification

In column 5, line 56, after "including" insert -- . --.

In column 7, line 35, delete "the a" and insert -- a --, therefor.

In column 11, line 45, after "complex" insert -- . --.

In column 12, line 18, after "recording" insert -- . --.

In column 14, line 10, after "recording" insert -- . --.

In column 14, line 38, after "poor" insert -- . --.

Signed and Sealed this
Third Day of September, 2013

Teresa Stanek Rea
*Acting Director of the United States Patent and Trademark Office*